(12) United States Patent
Gaston et al.

(10) Patent No.: US 6,354,279 B2
(45) Date of Patent: Mar. 12, 2002

(54) FUEL DELIVERY MODULE FOR AN AUTOMOTIVE FUEL SYSTEM

(75) Inventors: Robert Duane Gaston, Dearborn Heights; Dequan Yu, Ann Arbor, both of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/776,555

(22) Filed: Feb. 2, 2001

Related U.S. Application Data

(62) Division of application No. 09/645,286, filed on Aug. 24, 2000, which is a division of application No. 08/869,298, filed on Jun. 4, 1997, now Pat. No. 6,170,472.

(51) Int. Cl.[7] .............................................. F02M 37/04
(52) U.S. Cl. ...................................... 123/509; 123/510
(58) Field of Search .................................. 123/516, 514, 123/509, 510; 417/435

(56) References Cited

U.S. PATENT DOCUMENTS

| | | | | | |
|---|---|---|---|---|---|
| 3,822,028 | A | * | 7/1974 | Stover | 220/564 |
| 3,945,361 | A | * | 3/1976 | Piotrowicz | 123/141 |
| 5,129,796 | A | * | 7/1992 | Emmert et al. | 417/435 |
| 5,392,750 | A | * | 2/1995 | Laue et al. | 123/509 |
| 5,452,701 | A | * | 9/1995 | Tuckey | 123/509 |
| 5,699,773 | A | * | 12/1997 | Kleppner et al. | 123/510 |
| 5,809,975 | A | * | 9/1998 | Tuckey et al. | 123/509 |
| 5,830,371 | A | * | 11/1998 | Smith et al. | 210/787 |

\* cited by examiner

Primary Examiner—Carl S. Miller
(74) Attorney, Agent, or Firm—John E. Kajander

(57) ABSTRACT

A fuel delivery module for an automotive fuel delivery system includes a reservoir and a fuel pump. The fuel pump delivers fuel from the tank to the reservoir via a fuel tank inlet and reservoir outlet and from the reservoir to the engine via a reservoir inlet and engine outlet. The reservoir is formed with a plurality of contaminant traps for collecting contaminants contained in the fuel as the fuel is pumped through the reservoir such that the contaminants settle unto said contaminant traps thereby reducing the amount of contaminants entering the reservoir inlet.

6 Claims, 4 Drawing Sheets

FUEL DELIVERY MODULE FOR AN AUTOMOTIVE FUEL SYSTEM

CROSS-REFERENCE TO RELATED APPLICATIONS

This is a divisional of U.S. Pat. application Ser. No. 09/645,286 filed on Aug. 24, 2000, which is a division of application Ser. No. 08/869,298, filed Jun. 4, 1997, now U.S. Pat. No. 6,170,472.

FIELD OF THE INVENTION

The present invention relates generally to fuel delivery modules for automotive fuel systems, and, more particularly, to fuel delivery modules having contaminant collection traps.

BACKGROUND OF THE INVENTION

Automotive fuel systems typically include a reservoir in the fuel tank and a primary fuel pump submerged in the reservoir to supply fuel to the engine. The purpose of the reservoir is to keep the primary pump inlet submerged under operating conditions which could otherwise expose the inlet, such as when the vehicle is parked on an incline with an almost empty fuel tank or during cornering maneuvers wherein fuel moves away from the fuel inlet. A secondary pump is dedicated to filling the reservoir. In such systems, the primary pump delivers fuel from the reservoir to the engine and the secondary pump delivers fuel from the tank to the reservoir. In addition, filters may be used in cooperation with the inlet to the pumps to filter any contaminants in the fuel. The reservoir, fuel pumps and other components are typically, collectively referred to as a fuel delivery module, which will be used herein.

The inventors of the present invention have recognized certain disadvantages with these systems. For example, because the inlets to the primary and secondary pumps may require a filter, the fuel delivery module may include a large number of associated component parts resulting in a relatively large size to accommodate the components and filters. In addition, the filters may become prematurely occluded with contaminants due to the relatively large amount of contaminants that may be contained within the fuel, thereby decreasing the service life of the filter. Also, these filters may not be effective in filtering relatively small contaminants, which may prematurely wear the components of the primary pump, such as the fuel pump impeller, as well as adversely effect the fuel system. Thus, it is desirable to collect and trap contaminants in the fuel prior to the contaminants reaching the inlet to the primary pump.

SUMMARY OF THE INVENTION

An object of the present invention is to reduce the amount of contaminants entering a primary fuel pump. This object is achieved, and disadvantages of prior art approaches are overcome, by providing a novel fuel delivery module for an automotive fuel system. In one particular aspect of the invention, the fuel delivery module includes a reservoir having a bottom and a side. The reservoir stores a portion of the fuel stored in the fuel tank. A fuel pump is disposed within the reservoir and has a fuel tank inlet, a reservoir outlet, a reservoir inlet and an engine outlet. The fuel pump pumps fuel from the tank to the reservoir via the fuel tank inlet and reservoir outlet and pumps fuel from the reservoir to the engine via the reservoir inlet and engine outlet. The fuel delivery module also includes a plurality of contaminant traps formed in the bottom of the reservoir for collecting contaminants contained in the fuel as fuel is pumped through the reservoir such that the contaminants settle into the contaminant traps thereby reducing the amount of contaminants entering the reservoir inlet of the fuel pump. In a preferred embodiment, the contaminant traps have an oblong-shaped cross-section for enhancing retention of the fuel contaminants within the traps.

Also, in a preferred embodiment, the fuel delivery module includes a deflector disposed within the reservoir for directing contaminants away from the reservoir inlet of the fuel pump and toward the contaminant traps.

An advantage of the present invention is that the number of fuel filters used for the fuel delivery module is reduced.

Another advantage of the present invention is that the service life of the primary pump filter is increased.

Still another advantage of the present invention is that small contaminants are collected and contained so that it is unlikely that they will pass through the primary pump filter.

Other objects, features and advantages of the present invention will be readily appreciated by the reader of this specification.

BRIEF DESCRIPTION OF THE DRAWINGS

The invention will now be described, by way of example, with reference to the accompanying drawings, in which.

DETAILED DESCRIPTION OF THE PREFERRED EMBODIMENTS

Figure 1:
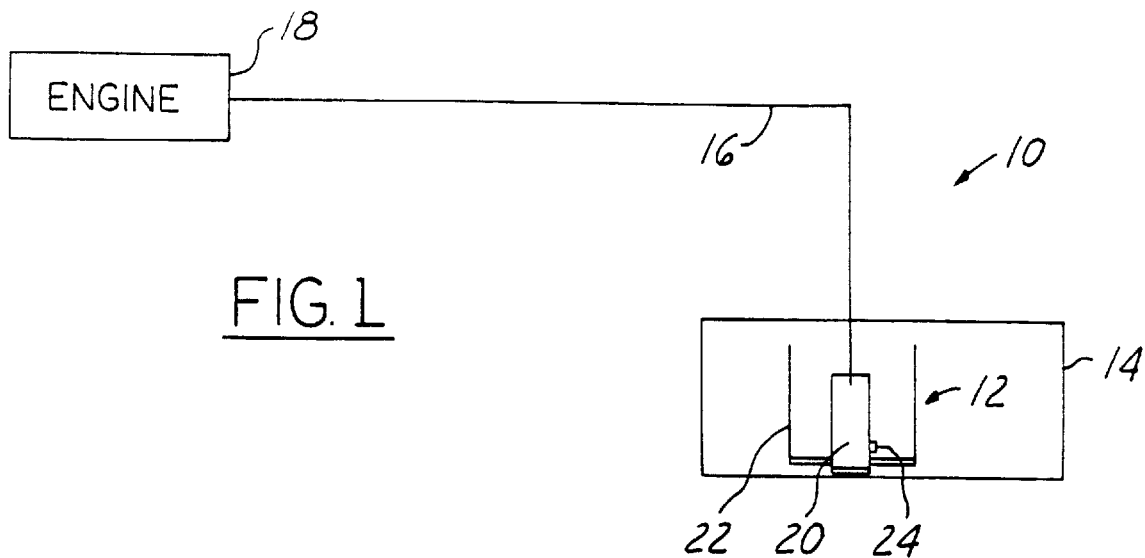
FIG. 1 is a schematic representation of an automotive fuel delivery system.

Fuel system 10, shown in FIG. 1, includes fuel delivery module 12 disposed within fuel tank 14 for delivering fuel through fuel line 16 to engine 18 of an automotive vehicle. Fuel delivery module 12 includes fuel pump 20, which, in this example, is an electric fuel pump controlled by an engine controller (not shown), submerged within reservoir 22 for supplying fuel to engine 18. Reservoir 22 is in fluid communication with fuel tank 14 and is used to keep reservoir inlet 24 of fuel pump 20 submerged under certain vehicle operating conditions, such as low fuel, cornering maneuvers and other such conditions known to those skilled in the art and suggested by this disclosure. In the example described herein, fuel pump 20 pumps fuel from tank 14 to reservoir 22 and from reservoir 22 to engine 18. Those skilled in the art will recognize in view of this disclosure that other pumps, such as a jet pump, may be used to pump fuel from tank 14 to reservoir 22. The fuel system described herein is a returnless fuel system. However, those skilled in the art will recognize in view of this disclosure that a return type fuel system may be used, with the return fuel being returned directly to reservoir 22, tank 14, or to the jet pump (not shown) as desired.

Figure 2:
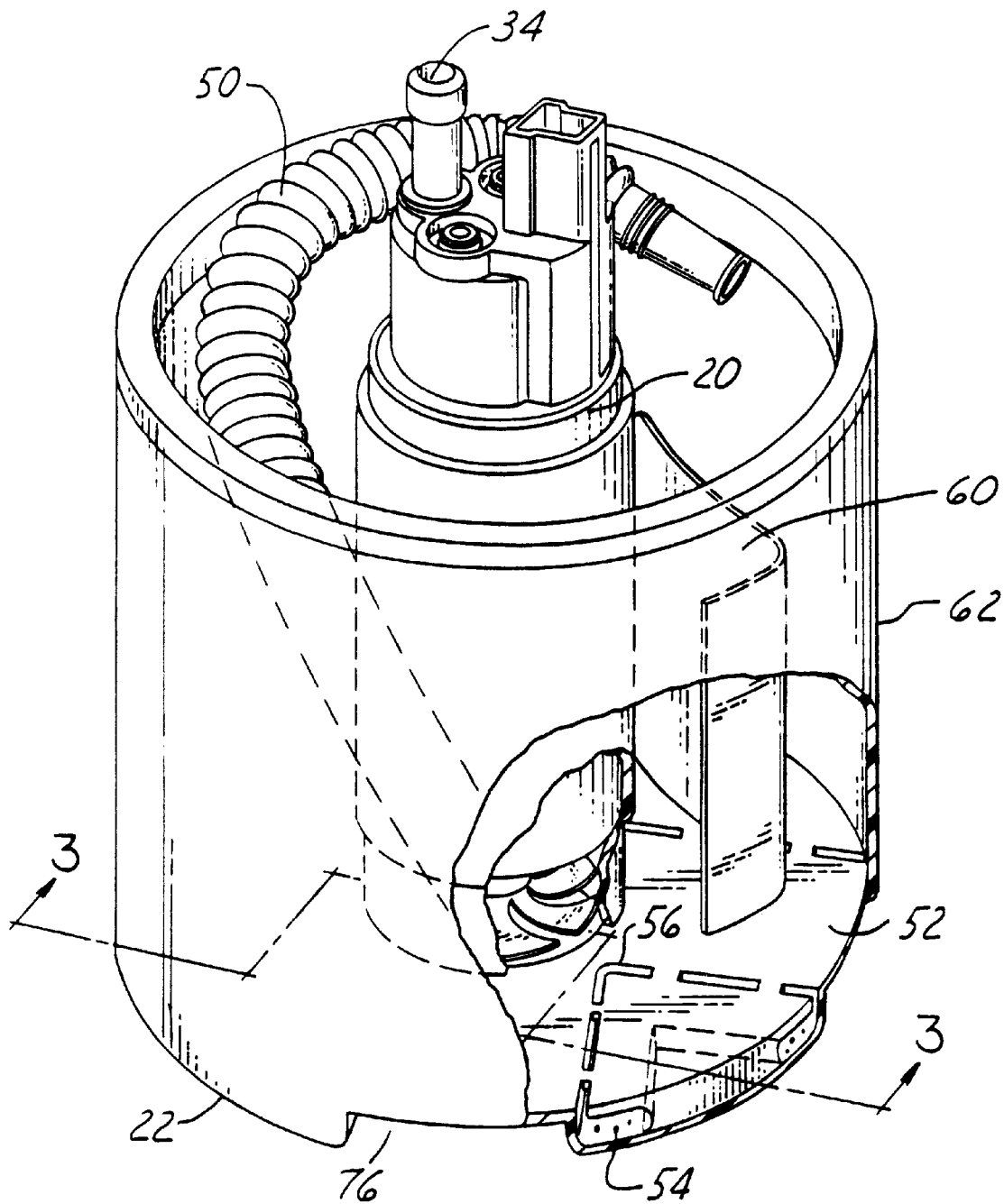
FIG. 2 is a partial cross-sectional perspective view of a fuel delivery module according to the present invention.
Figure 3:
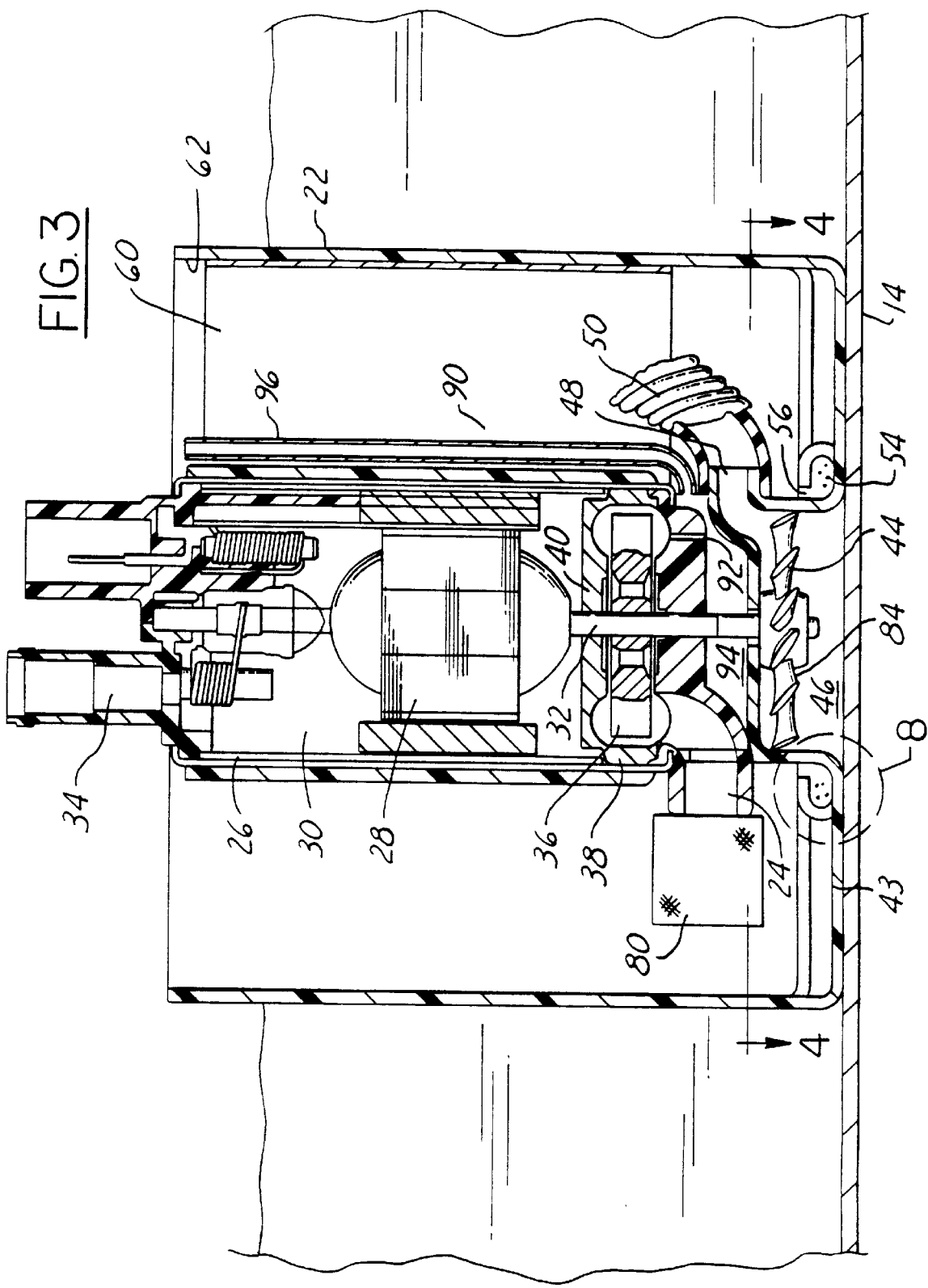
FIG. 3 is a cross-section of the fuel delivery module taken along line 3—3 of FIG. 2.

Referring now to FIGS. 2 and 3, fuel pump 20 is mounted within reservoir 22. As best shown in FIG. 3, pump 20 has casing 26 for containing motor 28, which is mounted within motor space 30. Motor 28 has shaft 32 extending therefrom in a direction from engine outlet 34 to reservoir inlet 24. Primary pumping element 36, preferably an impeller, or, alternatively, a regenerative turbine, is slidingly engaged on to shaft 32 and is encased within pump housing 38, which is composed of pump bottom 40 and pump cover 42. Primary impeller 36 pumps fuel from reservoir 22, through reservoir inlet 24, through engine outlet 34 and onto engine 18. Shaft 32 passes through shaft opening 34 of pump cover 42 through bottom 43 of reservoir 22 to engage secondary impeller 44 which is disposed outside of reservoir 22. In this example, secondary impeller 44 is an axial-flow multi-blade helical impeller. Reservoir 22 is formed with tank inlet area 46 and reservoir outlet 48. Thus, fuel pump 20, via the operation of secondary impeller 44, pumps fuel from tank 14, through tank inlet area 46, through reservoir outlet 48, and into reservoir 22. Reservoir outlet 48 may be fitted with hose 50 for delivering fuel to the top of reservoir 22 (see FIG. 2).

Figure 9:
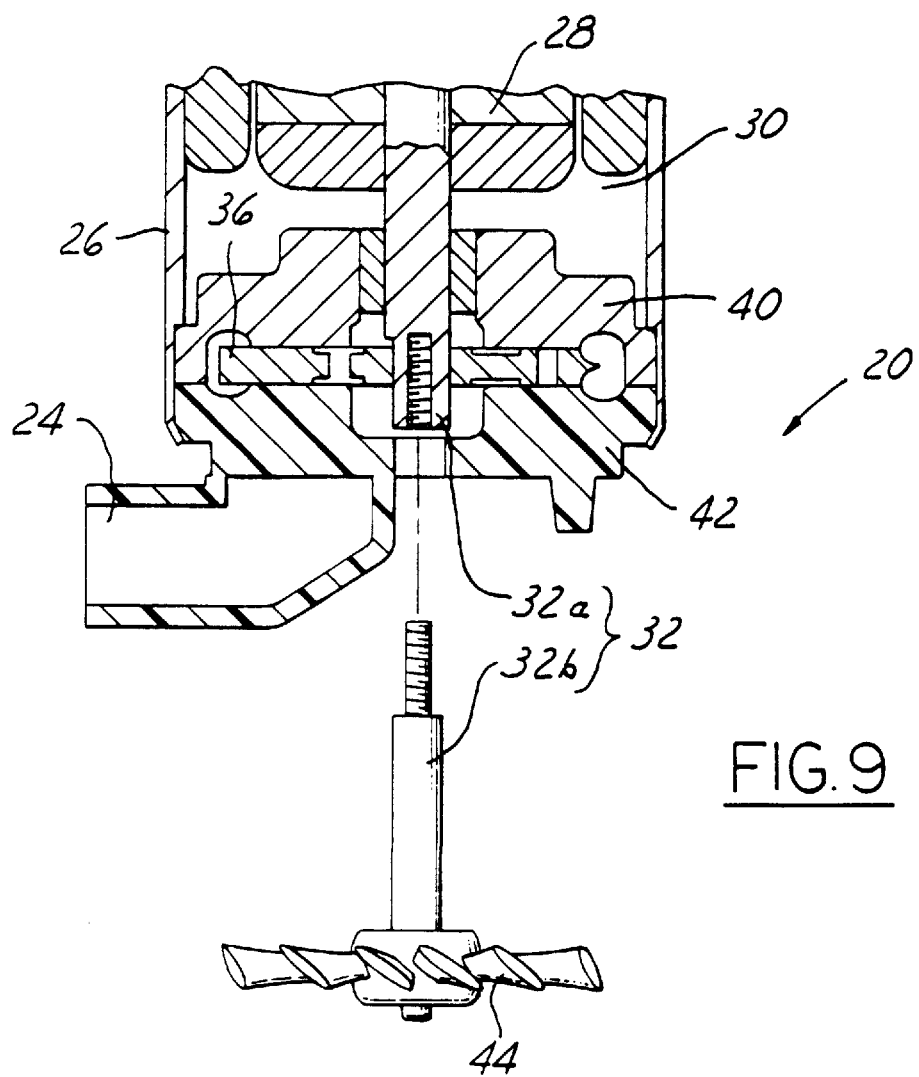

Referring briefly to FIG. 9, shaft 32 may compose two shaft portions, 32a and 32b, coupled together by threads. According to the present invention the direction of the threads joining shafts 32a and 32b is opposite to the direction of rotation of pump 20. In this example, the threads are formed with a conventional, right hand thread and the pump rotates in a left hand direction. Thus as fuel pump 20 rotates to pump fuel to engine 18, the connection of secondary impeller 44 to motor shaft 32 is assured because the rotation of pump 20 tends to tighten secondary impeller 44 to motor shaft 32.

Continuing with reference to FIGS. 2 and 3, fuel supplied to secondary impeller 44 is intentionally not filtered, allowing any contaminants in the fuel to be pumped from tank 14 to reservoir 22. According to the present invention, reservoir 22 includes contaminant traps 54 formed in bottom 43 of reservoir 22 for collecting contaminants entering reservoir 22 from tank 14 through the operation of pump 20 as previously described. Contaminants circulating within reservoir 22 settle toward bottom 43 and pass through openings 56 and enter contaminant traps 54. In a preferred embodiment, contaminant traps 54 have a generally oblong-shaped cross section. This oblong-shape effectively prevents contaminants from escaping once they have entered contaminant traps 54. That is, swirling fuel in traps 54, which follows the oblong-shape thereof, effectively reduces the amount of contaminants escaping through openings 56.

As best shown in FIG. 2, fuel delivery module 12 further includes directional control deflector 60 attached to the inner sidewall 62 of reservoir 22. Deflector 60 cooperates with hose 50 so as to impart a rotational flow on the fuel as well as divert the fuel toward contaminant traps 54 such that any contaminants within the fuel is desirably directed toward contaminant traps 54.

Figure 4:
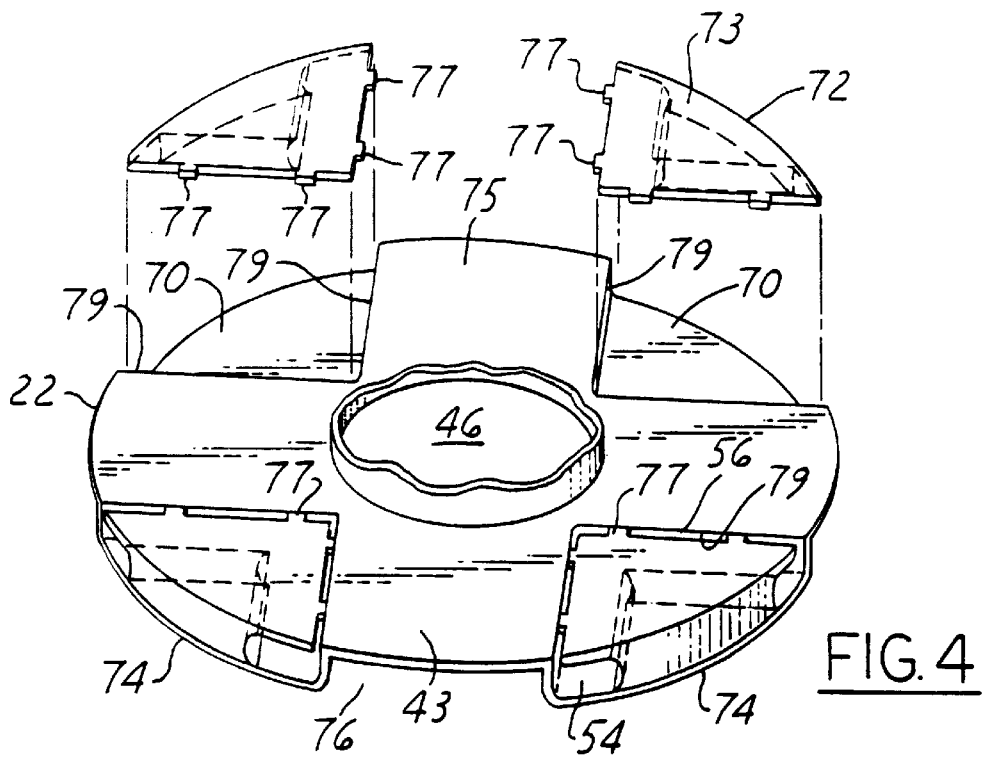
FIG. 4 is a cross-section of the fuel delivery module taken along line 4—4 of FIG. 3.
Figures 5, 7:
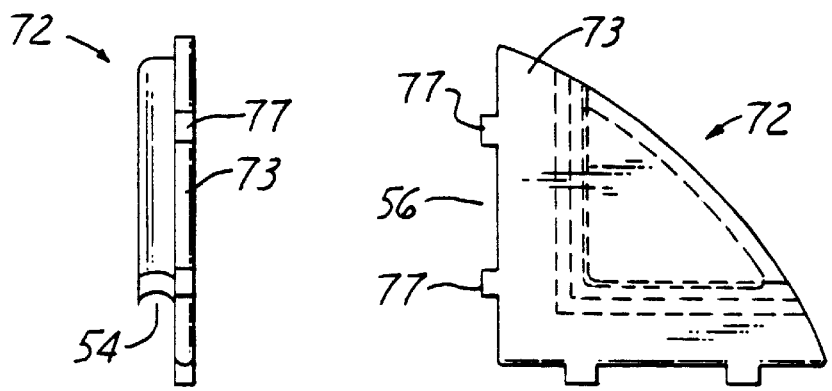
FIGS. 5–7 are views of contaminant traps incorporated in a fuel delivery module according to she present invention.

Turning now to FIGS. 4–7, a preferred embodiment of the present invention is shown. Bottom 43 of reservoir 22 is formed with a plurality of recesses 70 which form part of contaminant traps 54. In addition, contaminant trap covers 72 are fitted within recesses 70 and cooperate with recesses 70 so as to complete contaminant traps 54 together with openings 56. That is, each cover 72 has a top surface 73, such that when each cover 72 is placed over recess 70, top 73 is coplanar with inside surface 75 of bottom 43. Also, covers 72 include tabs 77, which space covers 72 away from wall 79 of recess 70 as to define holes 56. Further, as best shown in FIG. 4, recesses 70 formed in reservoir bottom 43 result in protrusions 74 on the outer surface of bottom 43. Protrusions 74 cooperate with bottom 43 to define a fluid flow channel 76 to allow fuel from tank 14 to flow under reservoir 22 so that fuel may be pumped into reservoir 22 by secondary impeller 44.

Because contaminants in the fuel are collected in contaminant traps 54, reservoir inlet filter 80, which is attached to inlet 24 (see FIG. 3), may be made smaller as a result of the decreased amount of contaminants within the fuel in reservoir 22. In addition, because secondary impeller 44 pumps contaminants in the fuel from tank 14 through reservoir 22, leading edges 82 of secondary impeller are generally constructed with a rounded edge to withstand the wear effects of the contaminants.

Figure 8:
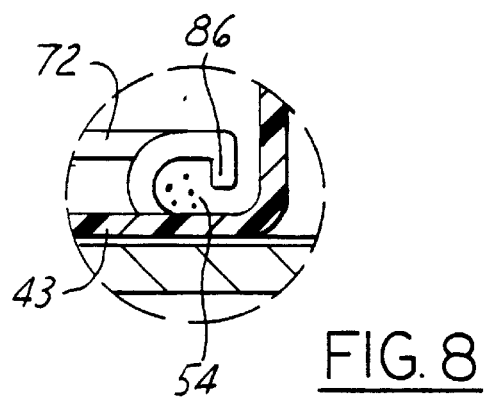
FIG. 8 is an enlarged alternative embodiment of the area encircled by line 8 of FIG. 3; and, FIG. 9 is an exploded cross-sectional view of a fuel pump according to the present invention.
Figure 6:
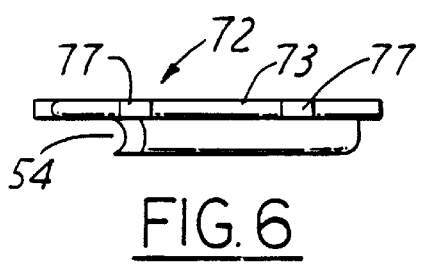

Referring now to FIG. 8, contaminant traps 54 are shown having an alternative configuration. In this embodiment, inwardly extending tab 86 extends into trap 54 to further inhibit contaminants from escaping therefrom. Tab 86 may be formed on cover 70, as shown.

Referring again now to FIG. 3, in a preferred embodiment, fuel delivery module 12 further includes vapor management section 90 for collecting and venting fuel vapor to the vehicle's fuel vapor recovery system. Fuel pump cover 42 includes vapor purge orifices 92 for purging any vapor generated in the pumping chamber of primary impeller 36. This purged vapor is collected within vapor chamber 94 and is eventually directed away from fuel pump 20 via vapor purge line 96, which may be connected to the fuel vapor recovery system.

While the best mode for carrying out the invention has been described in detail, those skilled in the art in which this invention relates will recognize various alternative designs and embodiments, including those mentioned above, in practicing the invention that has been defined by the following claims.

We claim:

1. A fuel delivery module for a fuel system in an automotive vehicle, the fuel system including a fuel tank for storing fuel and the vehicle including an engine, with said fuel delivery module comprising:

a reservoir having a bottom and a side, with said reservoir storing a portion of the fuel stored in the fuel tank;

a means for pumping fuel from the fuel tank to said reservoir and from said reservoir to the engine; and, a contaminant trap formed in said bottom of said reservoir for collecting contaminants contained in the fuel as fuel is pumped through said reservoir by said means for pumping fuel from the tank to the reservoir such that the contaminants settle into said contaminant trap thereby reducing the amount of contaminants entering said means for pumping fuel from said reservoir to the engine;

said means for pumping fuel comprising:

a motor;

a shaft axially extending from said motor;

a regenerative turbine impeller coupled to said shaft and disposed within said reservoir for pumping fuel from the reservoir to the engine; and an axial flow impeller coupled to said shaft and disposed outside said reservoir for pumping fuel from the tank to the reservoir, with said axial flow impeller having a plurality of vanes each having a leading edge, with said leading edge being generally rounded such that said contaminants have substantially no wear impact on said axial flow impeller as said axial flow impeller pumps fuel containing said contaminants from said tank to said reservoir.

2. A fuel delivery module according to claim 1 wherein said contaminant trap has a generally oblong-shaped cross-section for enhancing retention of the fuel contaminants within said trap.

3. A fuel delivery module according to claim 1 wherein the inside surface of said bottom of said reservoir is formed with a recess and wherein said fuel delivery module further comprises a contaminant trap cover, with said cover cooperating with said recess to define said contaminant trap.

4. A fuel delivery module according to claim 3 further comprising a second contaminant trap, wherein the inside surface of said bottom of said reservoir is formed with a second recess and wherein said fuel delivery module further comprises a second contaminant trap cover, with said second cover cooperating with said second recess to define said second contaminant trap and wherein said second recess forms a second protrusion on the outer surface of said bottom, with said protrusions cooperating with said bottom to define a fluid flow channel to allow fuel from said tank to flow under said reservoir so that the fuel may be pumped into said reservoir.

5. A fuel delivery module according to claim 1 further comprising a directional control deflector disposed within said reservoir, with said directional control deflector cooperating with said means for pumping fuel from the tank to said reservoir so as to impart a rotational flow on the fuel thereby inducing settlement of the contaminants into said contaminant trap.

6. A fuel delivery module according to claim 1 further comprising a directional control deflector disposed within said reservoir, with said directional control deflector cooperating with said means for pumping fuel from the tank to said reservoir so as to divert the fuel containing said contaminants toward said contaminant trap.

* * * * *